Jan. 12, 1943.  M. FEDAK  2,308,068
HOBBY HORSE MOUNTED ON WHEELS
Filed Oct. 20, 1941
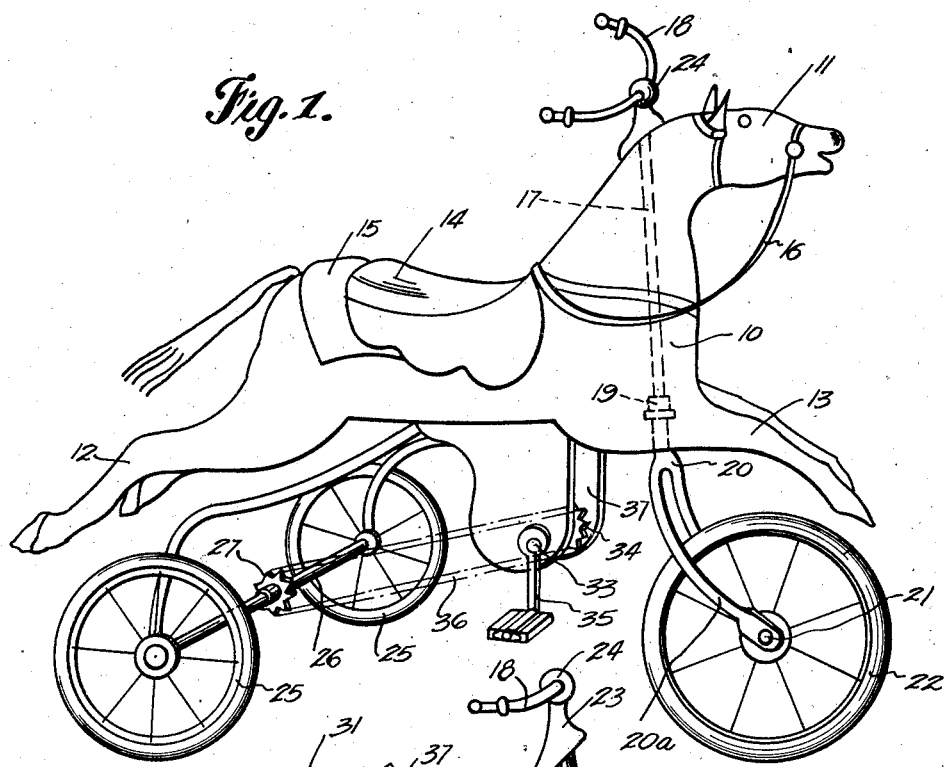
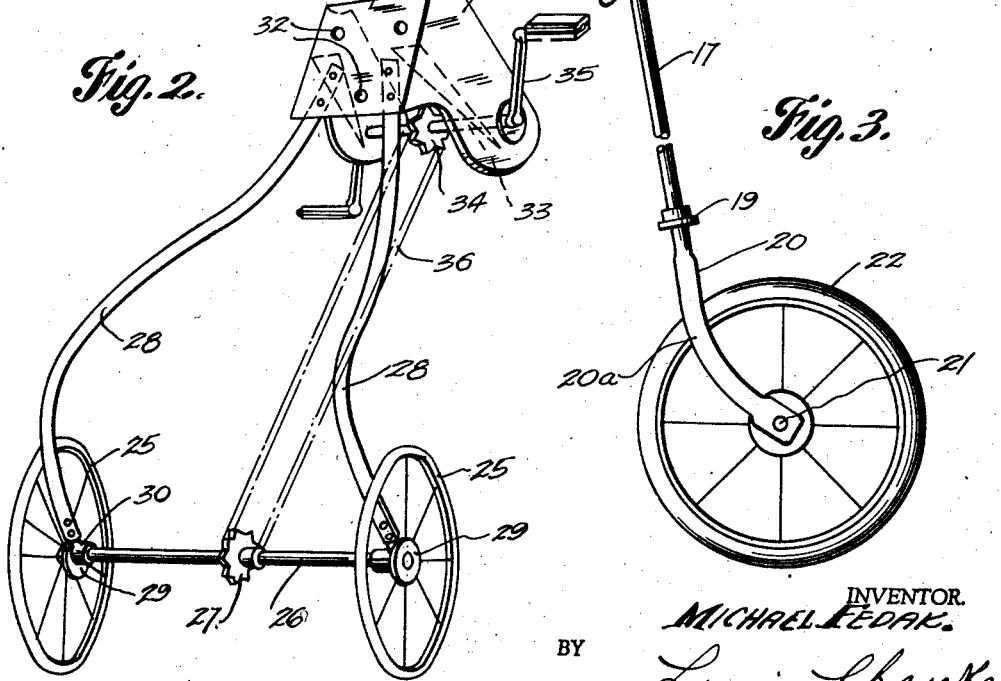
INVENTOR.
MICHAEL FEDAK.
BY Louis Chayka Patented Jan. 12, 1943

2,308,068

UNITED STATES PATENT OFFICE 2,308,068

HOBBYHORSE MOUNTED ON WHEELS

Michael Fedak, Hamtramck, Mich.

Application October 20, 1941, Serial No. 415,739

2 Claims. (Cl. 280—1.13)

It is my purpose to provide for the use of children a hobbyhorse of simple construction in which the figure of a horse may be easily mounted on a framework, which is also of very simple construction.

Another purpose is to provide a hobbyhorse on wheels to be propelled by pedals, in which the mechanism needed to propel the wheels is partly enclosed. Another purpose is to provide a framework on which the hobbyhorse is to be mounted, said framework containing a minimum number of parts. My invention consists in combination of a few elements and more particularly in the novel arrangement of said elements.

I shall now describe my improvement with reference to the accompanying drawing, in which:

Fig. 1 is a perspective view of my horse, including framework and wheels.

Fig. 2 is a perspective view of one part of the framework on which the horse is mounted.

Fig. 3 is a side view of the steering rod and a wheel on which it is mounted, both being a part of the hobby horse assembly described herein.

Similar numerals refer to similar parts throughout the several views.

The hobbyhorse shown in Fig. 1 may be made of wood or any other, preferably light substance. The trunk of the horse is indicated by numeral 10; the head by numeral 11. Numeral 12 indicates hind legs; numeral 13 indicates front legs. 14 is a saddle; 15 is a blanket underneath the saddle. 16 are reins. Journalled in the front part of the body of the horse is a steering rod 17 disposed substantially in a perpendicular position, as shown. At the top the rod passes through an ornamental collar 23, which is affixed to the neck of the horse, and terminates in a ball 24 supporting handle bars 18. At the lower end steering rod 17 passes through a bushing 19, set in a fixed position in the body of the horse, and terminates in a fork 20, its legs 20a straddling wheel 22. The diameter of the steering rod is somewhat smaller than that of the fork, so that a shoulder is formed at their conjunction and right under the bushing 19. This prevents the body of the horse from sliding down along the steering rod. The lower ends of legs 20a, spaced from each other, are mounted on axle 21 of the front wheel 22. By means of the handle bars 18 said wheel 22 may be easily turned in a desired direction.

A part of the weight of the body of the horse is sustained by said steering rod 17 and fork 20. The main part of the weight of the body of the horse and the operator thereon, if there be one, is carried by a metal framework supported on two rear wheels 25. The wheels are rotatably mounted on a horizontally disposed axle 26, provided with a sprocket wheel 27 keyed thereto. The framework consists of two elongated members 28, which at their lower end rest on said axle 26, by means of short bearing joints 29. Retaining rings 30 keep said joints 29 and said members 28 in a fixed relative position with respect to wheels 25. Members 28 converge, rising upwardly, and are connected at their respective upper ends to a substantially horizontal platform 31. The platform is perforated at 32 so as to be attached by means of bolts to the underbody of the horse. Depending from the sides of the platform, downwardly in a parallel relation to each other, are side plates 37. Journalled in these plates is axle 33 adapted to be rotated by pedals 35. Midway between the plates mounted on said axle 33, is sprocket wheel 34, suitably keyed to said axle. A chain 36 connects operatively sprocket 34 with sprocket 27 on what is the rear axle 26 of the assembly.

The operation of the hobbyhorse is quite obvious as it is the same as in other hobbyhorses of the same type. The inventive novelty involved in the structure presented by this applicant rests to a great extent in providing a platform support for the body of the horse, and in utilizing plates depending from platform 31 as means of support for the axle carrying the pedals, and by locating a sprocket wheel between said plates so as to eliminate the danger of entanglement of the clothing of the child operating the horse.

It will be seen that changes may be made in the structure shown by me without departing from the underlying spirit of my invention. What I wish to claim is as follows:

1. A hobbyhorse of the kind described comprising a body representing a quadruped, a steering rod rotatably passing downwardly through the front part of the body, resting on a wheel and forming a support for the said front part of the body, a substantially V-shaped frame, the diverging ends of which rest on an axle journaled therein, and supported by wheels at the respective ends thereof, the converging apex of the V-shaped frame being affixed to a horizontally disposed platform bearing the midsection of the body of the quadruped, said platform having depending sides, an axle journaled transversely in said depending sides and provided with a sprocket disposed on said axle between said depending sides, pedals affixed to the respective ends of the last said axle, and chain means actuated by said sprockets to drive the wheels supporting the V-shaped frame.

2. In a hobbyhorse of the kind described, mounted on wheels and comprising separate means to support the front end of the horse and a separate V-shaped frame to support the mid-section of the horse, a platform under the body of the horse at the apex of the V-shaped frame, flat sides depending from said platform, a pedal operated axle journaled in said depending sides and a sprocket keyed to said axle and disposed between said sides, said sprocket being a part of a chain and sprocket arrangement to rotate the wheels of the hobbyhorse.

MICHAEL FEDAK.